United States Patent [19]

Burguburu

[11] 4,048,662
[45] Sept. 13, 1977

[54] DEVICE FOR AVOIDING ACCIDENTS WHEN CLOSING A MOVABLE PANEL, FOR EXAMPLE THE PANEL OF AN ELECTRICALLY CONTROLLED SLIDING ROOF

[75] Inventor: Philippe Burguburu, Hericourt, France

[73] Assignee: Automobiles Peugeot, Paris, France

[21] Appl. No.: 677,298

[22] Filed: Apr. 15, 1976

[30] Foreign Application Priority Data

May 7, 1975 France .............................. 75.14308

[51] Int. Cl.² .......................................... H02H 7/085
[52] U.S. Cl. ...................................... 361/31; 318/469
[58] Field of Search ............. 317/13 R, 13 A, 135 R; 318/468, 469, 470, 467, 626, 282, 434, 466

[56] References Cited

U.S. PATENT DOCUMENTS

| 2,426,640 | 9/1947 | Peterson | 318/469 X |
|---|---|---|---|
| 2,611,888 | 9/1952 | Richards | 318/469 X |
| 2,715,706 | 8/1955 | Chin | 318/469 X |
| 3,178,627 | 4/1965 | Houk | 318/468 X |
| 3,813,590 | 5/1974 | Ellmore | 318/468 X |
| 3,886,407 | 5/1975 | Anderson | 317/13 R |
| 3,891,909 | 6/1975 | Newson | 318/469 |

Primary Examiner—J D Miller
Assistant Examiner—Patrick R. Salce
Attorney, Agent, or Firm—Burns, Doane, Swecker & Mathis

[57] ABSTRACT

A cut-off switch is provided between the motor driving a sliding panel and the power supply for the motor. The cut-off switch becomes operative when the torque supplied by the motor during the displacement of the panel between the open and closed positions of the panel exceeds a predetermined value. An inhibiting device inhibits the actuation of the cut-off switch when the panel is in the immediate vicinity of its closed position.

1 Claim, 3 Drawing Figures

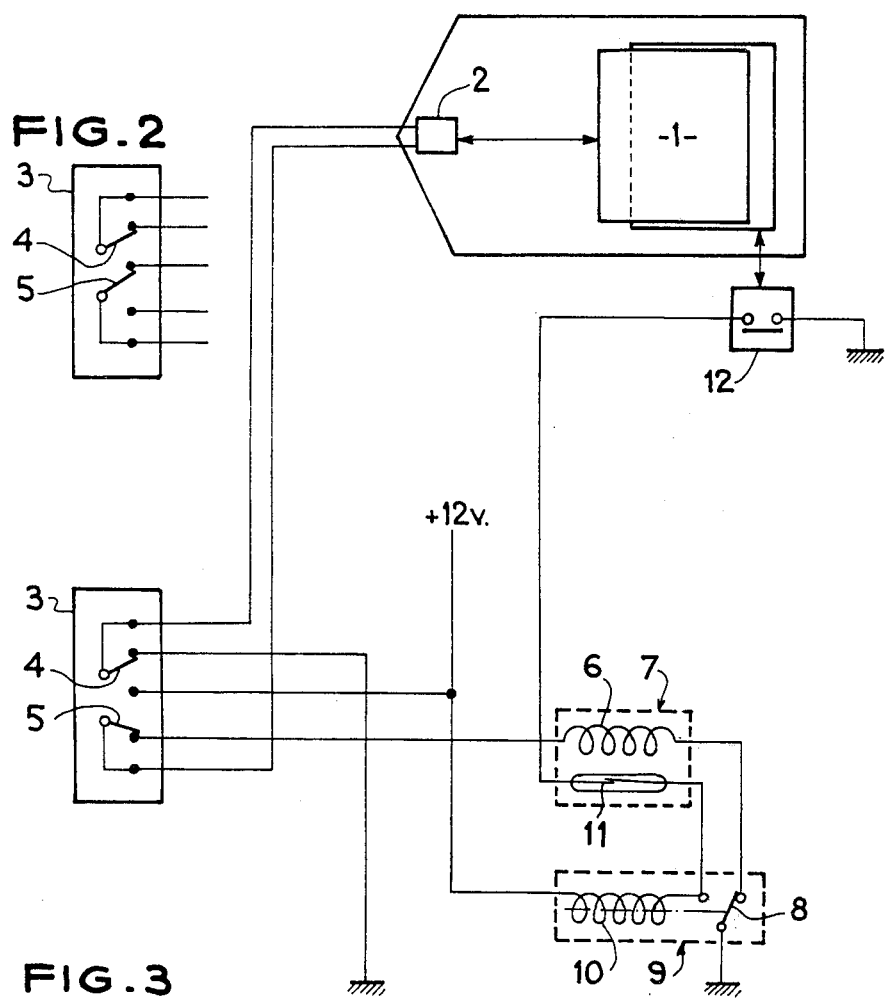

DEVICE FOR AVOIDING ACCIDENTS WHEN CLOSING A MOVABLE PANEL, FOR EXAMPLE THE PANEL OF AN ELECTRICALLY CONTROLLED SLIDING ROOF

The present invention relates to electric control devices for opening or sliding roofs or other movable panels of an automobile vehicle and more particularly relates to a safety device for avoiding accidents when closing an electrically movable panel.

Certain devices employed up to the present day for limiting the gravity of accidents, or for avoiding them, employ force limiters, such as torque limiters produced by using a low-power electric motor which is made to operate at full power, or kinematic systems which result in a weakening of the forces in the dangerous regions.

The aforementioned devices have many drawbacks. The torque limiter must be adjusted for a force exceeding the maximum force required over the whole of the travel of the movable panel. Now, if the force capable of being exerted on a panel, such as the sliding roof of a vehicle, is great when the panel is located at, say, 10 cm from its closing position, the torque limiter cannot perform its safety function.

A motor employed at full power only gives satisfactory results when the forces it must transmit are constant throughout the travel of the panel it drives. Now, this is not the case in respect of a sliding roof whose closure requires an additional force for crushing the sealing element it includes.

An appropriate kinematic system is not always possible.

An object of the present invention is to overcome the drawbacks of the known devices and to provide a safety device for electrically actuated movable panels, in particular for the sliding roof of an automobile vehicle, which permits avoiding any accident which might result from the presence of a part of the body of a passenger of the vehicle in the path of the panel.

According to the invention, there is provided a device for avoiding accidents when closing a movable panel, comprising an electric motor for driving said panel between an open position and a closed position, wherein means are provided for cutting off the supply to said motor when the torque exerted by the motor during the displacement of said panel between said opening and closing positions exceeds a predetermined value and means are provided for inhibiting said cut-off means when said panel is in the immediate vicinity of its closing position.

Further features and advantages of the invention will be apparent from the ensuing description with reference to the accompanying drawings given solely by way of example and in which:

FIG. 1 is an electric diagram of the device according to the invention, and

FIGS. 2 and 3 are views of the reversing switch 3 of the device shown in FIG. 1 in the open and closed position respectively.

The diagram of FIG. 1 shows a movable element 1, for example the sliding or opening roof of an automobile vehicle, driven by an electric motor 2 having permanent magnets. The motor 2 is connected to a d-c supply, for example the battery of the vehicle, through a two-way reversing switch 3.

The reversing switch 3 comprises a first moving contact 4 ensuring the connection of a terminal of the motor 2 to earth or to the d-c source and a second moving contact 5 ensuring the connection of the other terminal of the motor 2 selectively to said supply or to earth through the coil 6 of a first current-responsive electromagnetic relay 7 connected in series with a switch 8 controlled by a second relay 9 whose coil 10 is supplied by the battery of the vehicle.

The relay 9 is a relay having a high cut-off power and its coil 10 is connected to earth in series with the blade switch 11 of the relay 7 and an end-of-travel switch 12 controlled by mechanical means connected to the movable element 1.

The device just described operates in the following manner:

The position of the reversing switch 3 shown in FIG. 1 is the neutral position in which the two terminals of the motor 2 are connected to earth.

As the inductor of the motor is by-passed, the latter is stationary.

The device is in this state when the movable element 1 is in either of its end-of-travel positions or in an intermediate position chosen by the driver.

When it is desired to place the element 1 in the open position, the moving contacts 4 and 5 of the switch 3 are made to occupy the positions shown in FIG. 2.

It is then observed that one of the terminals of the motor 2 is now connected to the positive terminal of the battery so that the motor 2 is supplied with current and rotates in a direction causing the element 1 to move in the direction for opening it.

If the element 1 is initially closed, the switch 12 is initially open so that the retraction of the element 1 causes the closure of the switch 12.

When it is desired to return the element 1 to the closed position thereof, the moving contacts 4 and 5 of the switch 3 are returned to the positions shown in FIG. 3.

Now, the terminal of the motor 2 which was connected to earth in the preceding cases is now connected to the positive terminal of the battery, whereas the other terminal of the motor is now connected to earth through the coil 6 of the first relay 7 and the switch 8 actuated by the second relay 9 having a high cut-off power.

It will first be assumed that the movable element 1 occupies an instantaneous position remote from its closed position. In this position, the end-of-travel switch 12 is closed.

The supply circuit for the coil 7 of the relay 9 is opened since the switch 11 is not actuated and the switch 8 is at rest in the position shown in FIG. 1.

As the motor 2 has permanent magnets, the output torque of the motor is proportional to the supply current so that there corresponds to a normal force for displacing the movable element 1 a substantially constant torque of the motor and consequently a roughly constant intensity of the supply current of the motor.

If an obstacle opposes the displacement of the movable element 1, the intensity of the supply current of the motor 2 increases. Consequently, there is a corresponding increase in the current in the coil 6 of the relay 7. When this intensity reaches a predetermined value, it causes the closure of the blade switch 11 which is responsive to this value of the intensity and in turn causes current to be supplied to the relay 9. The switch 8 is actuated and causes the supply circuit of the motor 2 to be cut off and the motor stops.

The cutting off of the supply to the coil 6 causes the return of the blade switch 11 to its initial open state, but the coil 10 of the relay 9 remains self-supplied through the switch 8 which maintains the supply circuit of the motor 2 open.

In order to return the switch 8 to its position of rest as shown in FIG. 1, the connection must be cut off between the coil 10 and the +12 V terminal of the battery so that the movable element 1 can be once more closed if the obstacle which prevented its closure has disappeared.

When the movable element 1 reaches a position in the neighbourhood of its closed position so that practically no obstacle can be placed in the interval between the element and its closed position, the end-of-travel switch 12 is actuated and causes the opening of the supply circuit of the relay 9 which therefore can no longer actuate the switch 8. The motor 2, whose supply circuit remains closed, can then furnish the force necessary for blocking the element 1 in its closed position and, in particular when it concerns the sliding roof of a vehicle, the force necessary for compressing the sealing elements adapted to seal the roof. The end-of-travel switch 12 is actuated by conventional mechanical means, for example a push-button (not shown), which projects from the closed position of the movable element by a few millimeters.

When the closing operation has finished, the driver returns the switch 3 to its neutral position shown in FIG. 1.

Having now described my invention what I claim as new and desire to secure by Letters Patent is:

1. A device for avoiding accidents when closing a movable panel, comprising an electric motor for driving said panel between an open position and a closed position, means for connecting the motor to a power supply, means for cutting off the power supply connecting means when the torque furnished by the motor during the displacement of said panel between said positions exceeds a predetermined value, and means for inhibiting said cut-off means when said panel is located in the immediate vicinity of its closed position, wherein said cut-off means comprise a first electromagnetic relay having a coil, a second electromagnetic relay having a coil connected in a first switch capable of being controlled by the coil of the second relay, a second switch capable of being controlled by the first relay, the coil of the first relay being connected in series with the motor and with the first switch, the coil of the second relay being connected between the power connecting means and earth in series with the second switch and the inhibiting means.

* * * * *